(12) United States Patent
Tan et al.

(10) Patent No.: US 10,642,084 B2
(45) Date of Patent: May 5, 2020

(54) VIRTUAL CURVED SURFACE DISPLAY PANEL AND DISPLAY DEVICE

(71) Applicant: BOE TECHNOLOGY GROUP CO., LTD., Beijing (CN)

(72) Inventors: Jifeng Tan, Beijing (CN); Jian Gao, Beijing (CN); Yafeng Yang, Beijing (CN); Xiaochuan Chen, Beijing (CN); Wei Wang, Beijing (CN); Can Wang, Beijing (CN); Can Zhang, Beijing (CN); Qian Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 211 days.

(21) Appl. No.: 15/571,924

(22) PCT Filed: May 17, 2017

(86) PCT No.: PCT/CN2017/084696
§ 371 (c)(1),
(2) Date: Nov. 6, 2017

(87) PCT Pub. No.: WO2017/215397
PCT Pub. Date: Dec. 21, 2017

(65) Prior Publication Data
US 2018/0231812 A1 Aug. 16, 2018

(30) Foreign Application Priority Data
Jun. 15, 2016 (CN) .......................... 2016 1 0425514

(51) Int. Cl.
*G03B 21/60* (2014.01)
*G02F 1/1335* (2006.01)
(Continued)

(52) U.S. Cl.
CPC ....... *G02F 1/1335* (2013.01); *G02B 27/0983* (2013.01); *G02F 1/133526* (2013.01); *G09F 9/35* (2013.01)

(58) Field of Classification Search
CPC ............. G02F 1/1335; G02F 1/133526; G02B 27/0983; G09F 9/35
(Continued)

(56) References Cited

U.S. PATENT DOCUMENTS 5,515,122 A    5/1996  Morishima et al.
6,414,795 B1 * 7/2002  Sugawara ............ G02B 27/123
                                                         359/622
(Continued)

FOREIGN PATENT DOCUMENTS

CN    104464523 A      3/2015
CN    105390066 A  *   3/2016
(Continued)

OTHER PUBLICATIONS

First Office Action for Chinese Patent Application No. 201610425514.0 dated May 3, 2018.
(Continued)

*Primary Examiner* — William R Alexander
*Assistant Examiner* — Tamara Y. Washington
(74) *Attorney, Agent, or Firm* — Calfee, Halter & Griswold LLP

(57) ABSTRACT

A virtual curved surface display panel and a display device are provided. By using the imaging principle of the concave lens, the concave lens array is provided on the display surface of the flat display panel, and the focal lengths of the concave lenses are designed to be symmetrically distributed with respect to a vertical symmetry axis of the display surface. In the concave lenses on the same side of the symmetry axis, the focal lengths of the respective concave (Continued)

lenses having the same distance from the vertical symmetry axis are the same, and the focal lengths of the respective concave lenses having different distances from the vertical symmetry axis are different from each other. By setting the focal lengths of the concave lenses, the image distances of the pixels in the flat display panel are different so that the images of the plurality of pixels constitute a curved surface.

20 Claims, 3 Drawing Sheets

(51) Int. Cl.
*G02B 27/09* (2006.01)
*G09F 9/35* (2006.01)

(58) Field of Classification Search
USPC .......................................................... 359/454
See application file for complete search history.

(56) References Cited

U.S. PATENT DOCUMENTS

| | | | | |
|---|---|---|---|---|
| 10,520,734 | B1 * | 12/2019 | Chan | ................... G02B 27/0172 |
| 2004/0061775 | A1 * | 4/2004 | McCoy | ................ H04N 13/327 |
| | | | | 348/42 |
| 2013/0002724 | A1 * | 1/2013 | Heinrich | ................. G06F 1/163 |
| | | | | 345/676 |
| 2016/0124252 | A1 | 5/2016 | Kim et al. | |
| 2016/0195646 | A1 | 7/2016 | Su et al. | |
| 2018/0081252 | A1 | 3/2018 | Yang et al. | |
| 2018/0107012 | A1 | 4/2018 | Xu et al. | |

FOREIGN PATENT DOCUMENTS

| | | |
|---|---|---|
| CN | 105390066 A | 3/2016 |
| CN | 105589277 A | 5/2016 |
| CN | 105607381 A | 5/2016 |
| CN | 105629622 A | 6/2016 |
| CN | 105894970 A | 8/2016 |
| CN | 106054289 A | 10/2016 |
| CN | 205670419 U | 11/2016 |
| JP | 2002277903 A * | 9/2002 |
| JP | 2011232387 A | 11/2011 |
| JP | 2014086245 A | 5/2014 |

OTHER PUBLICATIONS

Search Report for International Patent Application No. PCT/CN2017/084696 dated Aug. 3, 2017.

* cited by examiner

VIRTUAL CURVED SURFACE DISPLAY PANEL AND DISPLAY DEVICE

RELATED APPLICATIONS

The present application is the U.S. national phase entry of the international application PCT/CN2017/084696, with an international filing date of May 17, 2017, which claims the benefit of Chinese Patent Application No. 201610425514.0, filed on Jun. 15, 2016, the entire disclosures of which are incorporated herein by reference.

TECHNICAL FIELD

The present invention relates to the field of display technology, and particularly to a virtual curved surface display panel and a display device.

BACKGROUND

Curved surface display can meet people's visual experience well. By applying curved surface display, the user can be provided with comfortable visual experience, realistic sense of immediacy, and good immersion effect.

SUMMARY

The embodiments of the present invention provide a virtual curved surface display panel and a display device.

An embodiment of the invention provides a virtual curved surface display panel. The virtual curved surface display panel comprises: a flat display panel having a plurality of pixels arranged in an array, and a concave lens array arranged on a display surface of the flat display panel for making images of the plurality of pixels form a curved surface. The concave lens array comprises a plurality of concave lenses arranged in an array. The focal lengths of the plurality of concave lenses are symmetrically distributed with respect to a vertical symmetry axis of a display surface of the flat display panel. In the concave lenses on the same side of the symmetry axis, the focal lengths of the respective concave lenses having the same distance from the vertical symmetry axis are the same, and the focal lengths of the respective concave lenses having different distances from the vertical symmetry axis are different from each other.

Optionally, in the virtual curved surface display panel provided by the embodiment of the present invention, the curved surface is a curved surface protruding toward the flat display panel.

Optionally, in the virtual curved surface display panel provided by the embodiment of the present invention, a focal length of each concave lens gradually decreases as a distance between the concave lens and the vertical symmetry axis increases.

Optionally, in the virtual curved surface display panel provided by the embodiment of the present invention, at least one pixel in the flat display panel corresponds to a concave lens in the concave lens array.

Optionally, in the virtual curved surface display panel provided by the embodiment of the present invention, a sub-pixel in the flat display panel corresponds to at least one concave lens in the concave lens array.

Optionally, in the virtual curved surface display panel provided by the embodiment of the present invention, a sub-pixel in the flat display panel corresponds to a plurality of concave lenses with the same focal length in the concave lens array.

Optionally, in the virtual curved surface display panel provided by the embodiment of the present invention, the plurality of concave lenses are biconcave lenses or liquid crystal lenses.

Optionally, in the virtual curved surface display panel provided by the embodiment of the present invention, the plurality of concave lenses are plano concave lenses.

Optionally, in the virtual curved surface display panel provided by the embodiment of the present invention, a concave surface of the plano concave lens is arranged on a side of the plano concave lens departing away from a display surface of the flat display panel, alternatively, a concave surface of the plano concave lens is arranged on a side of the plano concave lens facing a display surface of the flat display panel.

Optionally, in the virtual curved surface display panel provided by the embodiment of the present invention, the plurality of concave lenses are cylindrical concave lenses.

Optionally, in the virtual curved surface display panel provided by the embodiment of the present invention, the plurality of concave lenses are spherical concave lenses.

Optionally, in the virtual curved surface display panel provided by the embodiment of the present invention, the spherical concave lenses have the same aperture.

Optionally, in the virtual curved surface display panel provided by the embodiment of the present invention, the flat display panel is any one of a liquid crystal display panel, an electroluminescent display panel, a plasma display panel, or an electronic paper.

An embodiment of the invention further provides a display device comprising the virtual curved surface display panel provided by the above described embodiments.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE INVENTION

Figure 1A:
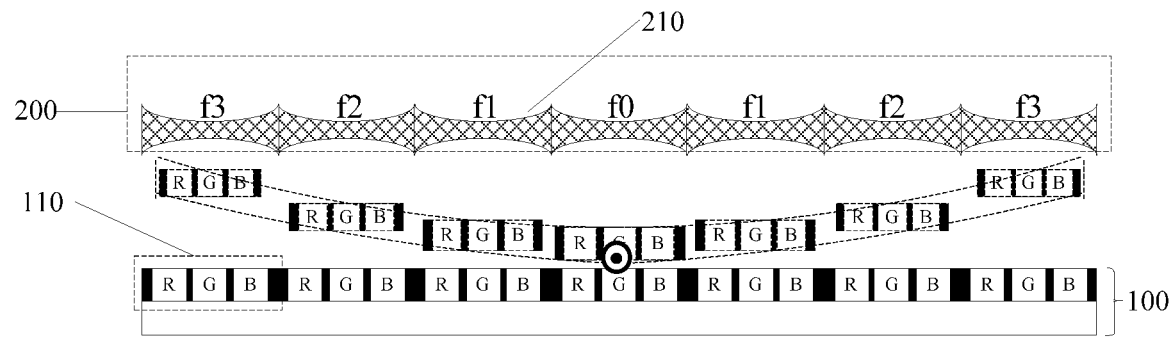
FIGS. 1a-1c are respectively structural schematic diagrams of virtual curved surface display panels according to embodiments of the invention.

In the following, with reference to the accompanying drawings, the implementation of the virtual curved surface display panel and the display device provided by the embodiment of the present invention will be described in detail.

The shape and size of the components in the drawings do not reflect the true proportions of the virtual curved surface display panel, the purpose of which is merely illustrative of the present invention.

In the prior art, in order to realize curved surface display, a curved surface display panel is usually formed by performing a physical mechanical bending process to a flat display panel. However, this method for realizing curved surface display may cause problems such as light leakage and abnormal color display on the display panel due to deformation of the edge portion.

In addition, in order to achieve curved surface display, in the prior art, many modules within the display panel should be designed with flexibility. Therefore, the product yield is low, and the cost of the product is relatively high accordingly.

Figure 1B:
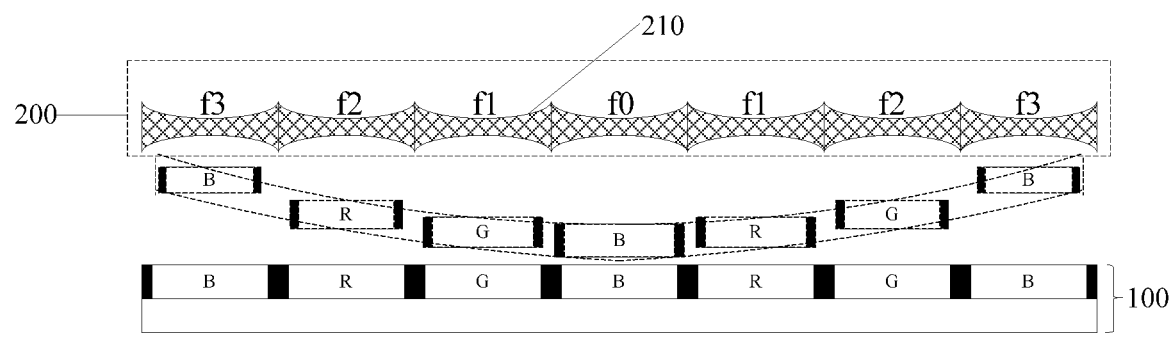

An embodiment of the invention provides a virtual curved surface display panel. As shown in FIG. 1a and FIG. 1b, the virtual curved surface display panel comprises: a flat display panel 100 having a plurality of pixels arranged in an array, and a concave lens array 200 arranged on a display surface of the flat display panel 100 for making images of the plurality of pixels form a curved surface. The concave lens array 200 comprises a plurality of concave lenses 210 arranged in an array. The focal lengths of the plurality of concave lenses 210 are symmetrically distributed with respect to a vertical symmetry axis of a display surface of the flat display panel. In the concave lenses 210 on the same side of the symmetry axis, the focal lengths of the respective concave lenses 210 having the same distance from the vertical symmetry axis are the same, and the focal lengths of the respective concave lenses 210 having different distances from the vertical symmetry axis are different from each other. The vertical symmetry axis refers to a symmetry axis in the vertical direction and parallel to the display surface (indicated by the sign ⊙ in FIG. 1a and perpendicular to the paper). The symmetry axis divides the display surface into two symmetrical regions. For example, in FIG. 1a and FIG. 1b, the position of the concave lens 210 with the focal length f0 is the position of the symmetry axis.

In the virtual curved surface display panel and display device provided by the embodiments of the present invention, by using the imaging principle of the concave lens 210 and setting the focal lengths of the concave lenses 210, the image distances of the pixels in the flat display panel 100 are different so that the images of the plurality of pixels constitute a curved surface. A visual effect of virtual curved surface can thus be realized by applying a flat display panel, thereby enhancing the visual impact effect.

Figure 2:
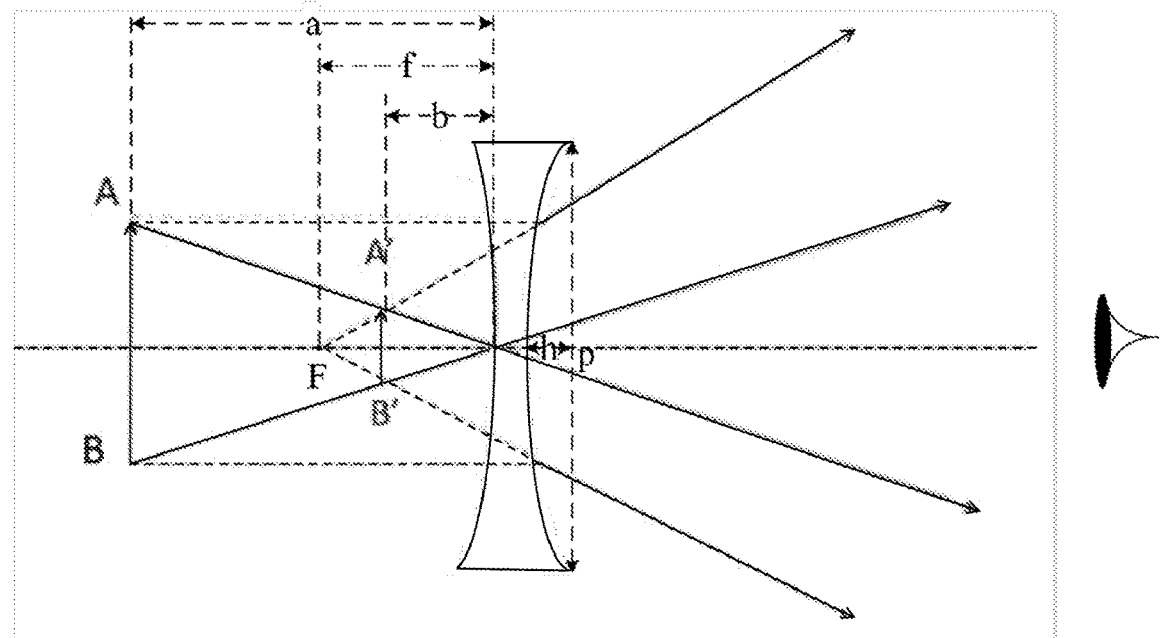
FIG. 2 is a schematic diagram showing the display principle of the concave lens.

Specifically, the imaging principle of concave lens is shown in FIG. 2. The object AB is imaged as an erected virtual image A'B'. The object AB and the image A'B' are on the same side of the concave lens. Therefore, the imaging principle of concave lens is applied for realizing a display effect of a front virtual surface with respect to the flat display panel 100.

The basic formulas of the optical system are given below.
Object-image relationship:

$$\frac{1}{a} + \frac{1}{b} = \frac{1}{f} \quad (1)$$

Focal length of plano concave lens:

$$f = \frac{r}{n-1} \quad (2)$$

Focal length of biconcave lens:

$$f = \frac{r_1 * r_2}{(n-1)\left(r_2 - r_1 + \frac{n-1}{n}d\right)} \quad (3)$$

Arch height of plano concave lens:

$$h = r - \sqrt{r_2 - \left(\frac{p}{2}\right)_2} \quad (4)$$

Paraxial magnification:

$$\tau = \frac{b}{a} \quad (5)$$

In the above basic formulas of the optical system, a represents the object distance, b represents the image distance, f represents the focal length of the concave lens, r represents the curvature radius of the concave lens, n represents the refractive index of the concave lens, h represents the arch height of the concave lens, d represents the thickness of the thinnest portion of the concave lens, and p represents the aperture of the concave lens (i.e., the diameter of the cross section of the concave lens).

In an implementation, in the virtual curved surface display panel provided by the embodiment of the present invention, as shown in FIG. 1a and FIG. 1b, the curved surface formed by the concave lens array 200 is a curved surface protruding toward the flat display panel 100.

From the above basic formulas of the optical system, it can be seen that when the object distance a is constant, the concave lenses with different focal lengths f can correspond to different image distances b. Based on this property, the focal lengths f of the concave lenses 210 in the concave lens array 200 can be set as shown in FIGS. 1a and 1b: the focal length f of each concave lens 210 decreases in accordance with the increase of the distance between the concave lens 210 and the symmetry axis. That is, in FIG. 1a and FIG. 1b, the concave lens 210 having the focal length f0 is located on the symmetry axis, f0<f1<f2<f3. In this way, the concave lens array 200 provides a front virtual image, and the images are arranged on a curved surface, thereby realizing a display effect of a front virtual surface with respect to the flat display panel 100.

Figure 1C:
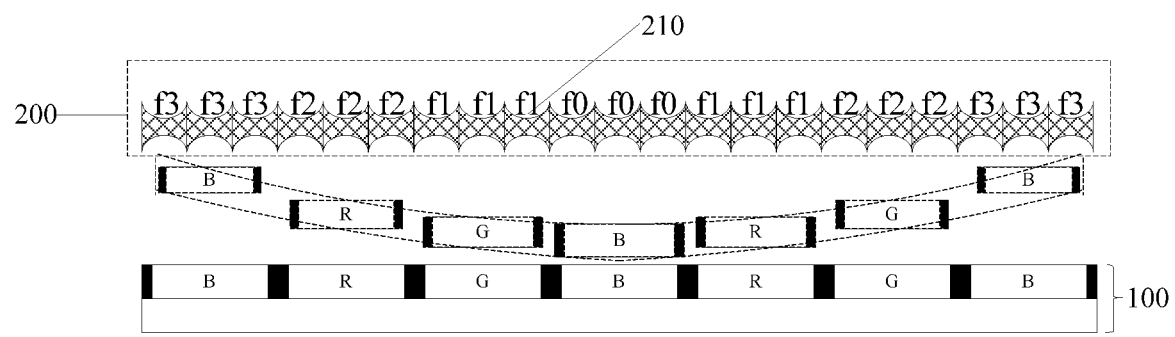

In an implementation, in the virtual curved surface display panel provided by the embodiment of the present invention, two modes can be applied for setting the relationship between the concave lenses 210 in the concave lens array 200 and the pixels in the flat display panel 100. In the first mode, at least one pixel RGB in the flat display panel 100 corresponds to a concave lens 210 in the concave lens array 200. As shown in FIG. 1a, a concave lens 210 can correspond to one pixel RGB (indicated with the reference sign 110). A concave lens 210 can also correspond to a plurality of pixels RGB. In the second mode, a sub-pixel R, G or B in the flat display panel 100 corresponds to at least one concave lens 210 in the concave lens array 200. As shown in FIG. 1b, one concave lens 210 corresponds to one sub-pixel R, G or B. Alternatively, as shown in FIG. 1c, a plurality of concave lenses 210 correspond to one sub-pixel R, G or B, and the focal lengths of the respective concave lenses corresponding to this sub-pixel are the same. In an implementation, a desired virtual display effect can be obtained by applying a mode in which one sub-pixel R, G or B corresponds to three concave lenses 210.

Figure 3:
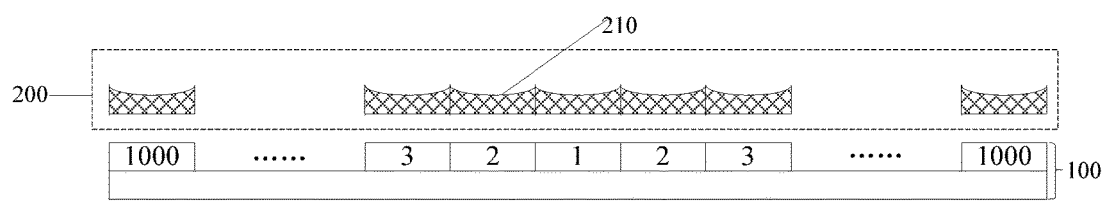
FIG. 3 is a structural schematic diagram of a virtual curved surface display panel according to an embodiment of the invention.
Figure 4:
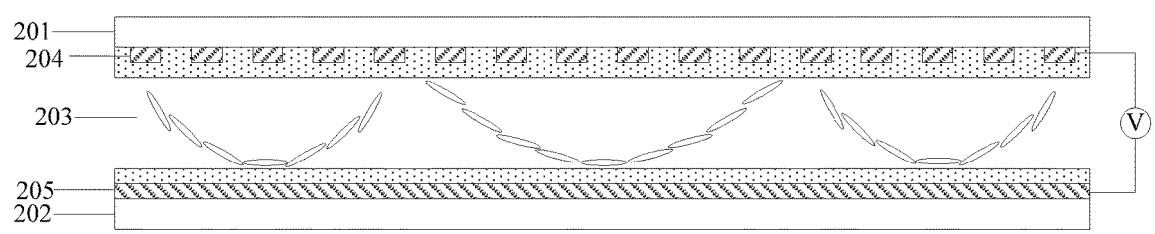
FIG. 4 is a structural schematic diagram of a virtual curved surface display panel according to an embodiment of the invention, in which liquid crystal lenses are used for realizing concave lenses.

In an implementation, in the virtual curved surface display panel provided by the embodiment of the present invention, the concave lens 210 in the concave lens array 200 can be a biconcave lens (i.e., a lens having two concave surfaces, as shown in FIGS. 1a and 1b) or a plano concave lens (i.e., a lens having a flat surface and a concave surface, as shown in FIG. 3) having a fixed focal length, the concave lens 210 can also be a liquid crystal lens with an adjustable focal length. As shown in FIG. 4, the liquid crystal lens generally includes: an upper substrate 201 and a lower substrate 202 arranged oppositely, and a liquid crystal layer 203 arranged between the upper substrate 201 and the lower substrate 202. A first electrode 204 is provided on a side of the upper substrate 201 facing the liquid crystal layer 203, and a second electrode 205 is provided on a side of the lower substrate 202 facing the liquid crystal layer 203. By controlling the voltage applied between the first electrode 204 and the second electrode 205, deflection of the corresponding liquid crystal in the liquid crystal layer 203 can be controlled, thereby providing an optical effect of a concave lens with a desired focal length.

When the concave lens array 200 is composed of biconcave lenses, the effect of aberration such as spherical aberration and distortion is smaller than that of the plano concave lens, so that it has a better display image effect. However, the implementation process of the biconcave lens realizing curved surface display is complicated than that of the plano concave lens. Either a biconcave lens or a plano concave lens can be manufactured with organic materials such as PMMA and resin, of which the refractive index is generally controlled at 1.4-1.8. The specific manufacturing process can apply but is not limited to exposure development, nanoimprint, laser direct writing or electron beam direct writing and so on.

Further, in the virtual curved surface display panel provided by the embodiment of the present invention, in order to facilitate the fabrication of the concave lens array 200, as shown in FIG. 3, a concave surface of the plano concave lens is arranged on a side of the plano concave lens departing away from a display surface of the flat display panel 100. Of course, a concave surface of the plano concave lens can also be arranged on a side of the plano concave lens facing a display surface of the flat display panel 100, which is not limited herein.

Further, in the virtual curved surface display panel provided by the embodiment of the present invention, the plano concave lens can be an aspherical concave lens such as a cylindrical concave lens, or can be a spherical concave lens. In particular, the imaging effect is better when a spherical concave lens is used.

Further, in the virtual curved surface display panel provided by the embodiment of the present invention, according to the above formula (2), it can be understood that different curvature radii r correspond to different focal lengths f. In order to make the spherical concave lenses have different focal lengths f, it is necessary to set the curvature radii of the spherical concave lenses. Specifically, the arch heights of the spherical concave lenses are set to a certain value, and the apertures of the spherical concave lenses can be set to different values, thereby achieving the effect of adjusting the curvature radii. Alternatively, the apertures of the spherical concave lenses are set to a certain value, and the arch heights of the spherical concave lenses are set to different values, thereby achieving the effect of adjusting the curvature radii. In an implementation, in order to facilitate the production, generally the apertures of the spherical concave lenses are set to be the same, and the curvature radii can be adjusted by adjusting the arch heights of the spherical concave lenses.

For example: the size of the pixel is 70 μm, the aperture of the spherical concave lens is 70 μm, the refractive index of the spherical concave lens n=1.5, then the above formula can be applied to calculate the design parameters of the concave lenses corresponding to different bending states. Taking 1000 pixels as an example, table 1 and table 2 list the design parameters of the concave lenses corresponding to these 1000 pixels. The left and right are symmetrical.

TABLE 1

| serial number of the pixel | object distance a (mm) | image distance b (mm) | aperture p (mm) | magnification τ | focal length f (mm) | curvature radius r (mm) | arch height h (mm) |
| --- | --- | --- | --- | --- | --- | --- | --- |
| 1 | 1 | 0.5000 | 0.07 | 0.5000 | 1.0000 | 0.5000 | 0.0012 |
| 2 | 1 | 0.4995 | 0.07 | 0.4995 | 0.9980 | 0.4990 | 0.0012 |
| 3 | 1 | 0.4985 | 0.07 | 0.4985 | 0.9940 | 0.4970 | 0.0012 |
| 4 | 1 | 0.4970 | 0.07 | 0.4970 | 0.9881 | 0.4940 | 0.0012 |
| 5 | 1 | 0.4950 | 0.07 | 0.4950 | 0.9803 | 0.4901 | 0.0013 |
| 6 | 1 | 0.4925 | 0.07 | 0.4925 | 0.9706 | 0.4853 | 0.0013 |
| 7 | 1 | 0.4896 | 0.07 | 0.4896 | 0.9592 | 0.4796 | 0.0013 |
| 8 | 1 | 0.4862 | 0.07 | 0.4862 | 0.9461 | 0.4731 | 0.0013 |
| 9 | 1 | 0.4823 | 0.07 | 0.4823 | 0.9315 | 0.4658 | 0.0013 |
| 10 | 1 | 0.4779 | 0.07 | 0.4779 | 0.9155 | 0.4577 | 0.0013 |
| 11 | 1 | 0.4732 | 0.07 | 0.4732 | 0.8981 | 0.4490 | 0.0014 |
| 12 | 1 | 0.4679 | 0.07 | 0.4679 | 0.8195 | 0.4398 | 0.0014 |
| 13 | 1 | 0.4623 | 0.07 | 0.4623 | 0.8599 | 0.4299 | 0.0014 |
| 14 | 1 | 0.4563 | 0.07 | 0.4563 | 0.8393 | 0.4197 | 0.0015 |
| 15 | 1 | 0.4499 | 0.07 | 0.4499 | 0.8180 | 0.4090 | 0.0015 |
| 16 | 1 | 0.4432 | 0.07 | 0.4432 | 0.7959 | 0.3980 | 0.0015 |
| 17 | 1 | 0.4361 | 0.07 | 0.4361 | 0.7733 | 0.3867 | 0.0016 |
| 18 | 1 | 0.4287 | 0.07 | 0.4287 | 0.7503 | 0.3752 | 0.0016 |
| 19 | 1 | 0.4210 | 0.07 | 0.4210 | 0.7270 | 0.3635 | 0.0017 |
| 20 | 1 | 0.4130 | 0.07 | 0.4130 | 0.7035 | 0.3517 | 0.0017 |

TABLE 1-continued

| serial number of the pixel | object distance a (mm) | image distance b (mm) | aperture p (mm) | magnification τ | focal length f (mm) | curvature radius r (mm) | arch height h (mm) |
|---|---|---|---|---|---|---|---|
| 100 | 1 | 0.3721 | 0.07 | 0.3721 | 0.5926 | 0.2963 | 0.0021 |
| 200 | 1 | 0.2980 | 0.07 | 0.2980 | 0.4246 | 0.2123 | 0.0029 |
| 300 | 1 | 0.2089 | 0.07 | 0.2089 | 0.2641 | 0.1321 | 0.0047 |
| 400 | 1 | 0.1256 | 0.07 | 0.1256 | 0.1436 | 0.0718 | 0.0091 |
| 500 | 1 | 0.0629 | 0.07 | 0.0629 | 0.0671 | 0.0336 | 0.0236 |
| 600 | 1 | 0.0252 | 0.07 | 0.0252 | 0.0259 | 0.0129 | −0.0196 |
| 700 | 1 | 0.0076 | 0.07 | 0.0076 | 0.0077 | 0.0038 | −0.0310 |
| 800 | 1 | 0.0015 | 0.07 | 0.0015 | 0.0015 | 0.0008 | −0.0342 |
| 900 | 1 | 0.0002 | 0.07 | 0.0002 | 0.0002 | 0.0001 | −0.0349 |
| 1000 | 1 | 0.0000 | 0.07 | 0.0000 | 0.0000 | 0.0000 | −0.0350 |

TABLE 2

| serial number of the pixel | object distance a (mm) | image distance b (mm) | aperture p (mm) | magnification τ | focal length f (mm) | curvature radius r (mm) | arch height h (mm) |
|---|---|---|---|---|---|---|---|
| 1 | 1 | 0.9000 | 0.07 | 0.9000 | 9.0000 | 4.5000 | 0.0001 |
| 2 | 1 | 0.8991 | 0.07 | 0.8991 | 8.9108 | 4.4554 | 0.0001 |
| 3 | 1 | 0.8973 | 0.07 | 0.8973 | 8.7373 | 4.3686 | 0.0001 |
| 4 | 1 | 0.8946 | 0.07 | 0.8946 | 8.4886 | 4.2443 | 0.0001 |
| 5 | 1 | 0.8910 | 0.07 | 0.8910 | 8.1770 | 4.0885 | 0.0001 |
| 6 | 1 | 0.8866 | 0.07 | 0.8866 | 7.8165 | 3.9082 | 0.0002 |
| 7 | 1 | 0.8813 | 0.07 | 0.8813 | 7.4215 | 3.7108 | 0.0002 |
| 8 | 1 | 0.8751 | 0.07 | 0.8751 | 7.0056 | 3.5028 | 0.0002 |
| 9 | 1 | 0.8681 | 0.07 | 0.8681 | 6.5808 | 3.2904 | 0.0002 |
| 10 | 1 | 0.8603 | 0.07 | 0.8603 | 6.1569 | 3.0784 | 0.0002 |
| 11 | 1 | 0.8517 | 0.07 | 0.8517 | 5.7418 | 2.8709 | 0.0002 |
| 12 | 1 | 0.8423 | 0.07 | 0.8423 | 5.3413 | 2.6706 | 0.0002 |
| 13 | 1 | 0.8322 | 0.07 | 0.8322 | 4.9593 | 2.4797 | 0.0002 |
| 14 | 1 | 0.8214 | 0.07 | 0.8214 | 4.5984 | 2.2992 | 0.0003 |
| 15 | 1 | 0.8099 | 0.07 | 0.8099 | 4.2598 | 2.1299 | 0.0003 |
| 16 | 1 | 0.7977 | 0.07 | 0.7977 | 3.9439 | 1.9719 | 0.0003 |
| 17 | 1 | 0.7850 | 0.07 | 0.7850 | 3.6504 | 1.8252 | 0.0003 |
| 18 | 1 | 0.7716 | 0.07 | 0.7716 | 3.3787 | 1.6893 | 0.0004 |
| 19 | 1 | 0.7577 | 0.07 | 0.7577 | 3.1277 | 1.5638 | 0.0004 |
| 20 | 1 | 0.7433 | 0.07 | 0.7433 | 2.8961 | 1.4481 | 0.0004 |
| 100 | 1 | 0.6697 | 0.07 | 0.6697 | 2.0280 | 1.0140 | 0.0006 |
| 200 | 1 | 0.5365 | 0.07 | 0.5365 | 1.1573 | 0.5787 | 0.0011 |
| 300 | 1 | 0.3761 | 0.07 | 0.3761 | 0.6027 | 0.3014 | 0.0020 |
| 400 | 1 | 0.2260 | 0.07 | 0.2260 | 0.2920 | 0.1460 | 0.0043 |
| 500 | 1 | 0.1132 | 0.07 | 0.1132 | 0.1277 | 0.0638 | 0.0104 |
| 600 | 1 | 0.0454 | 0.07 | 0.0454 | 0.0476 | 0.0238 | 0.0019 |
| 700 | 1 | 0.0137 | 0.07 | 0.0137 | 0.0139 | 0.0069 | 0.0274 |
| 800 | 1 | 0.0027 | 0.07 | 0.0027 | 0.0028 | 0.0014 | 0.0336 |
| 900 | 1 | 0.0003 | 0.07 | 0.0003 | 0.0003 | 0.0001 | 0.0349 |
| 1000 | 1 | 0.0000 | 0.07 | 0.0000 | 0.0000 | 0.0000 | 0.0350 |

Figure 5:
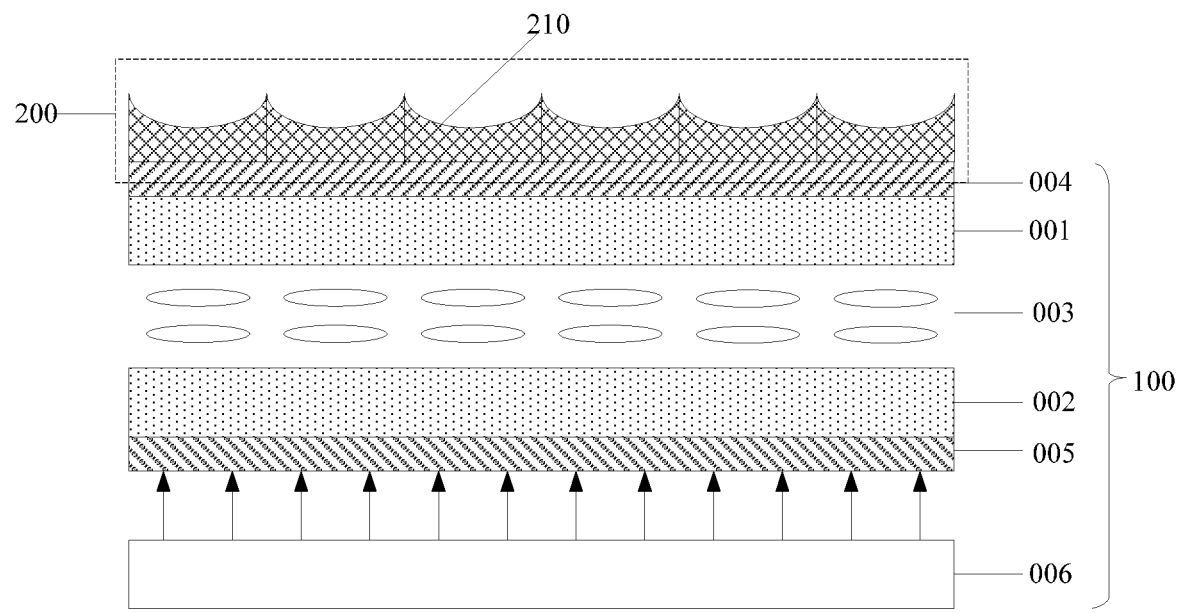
FIG. 5 is a structural schematic diagram of a virtual curved surface display panel according to an embodiment of the invention, in which a liquid crystal display panel is used as a flat display panel.
Figure 6:
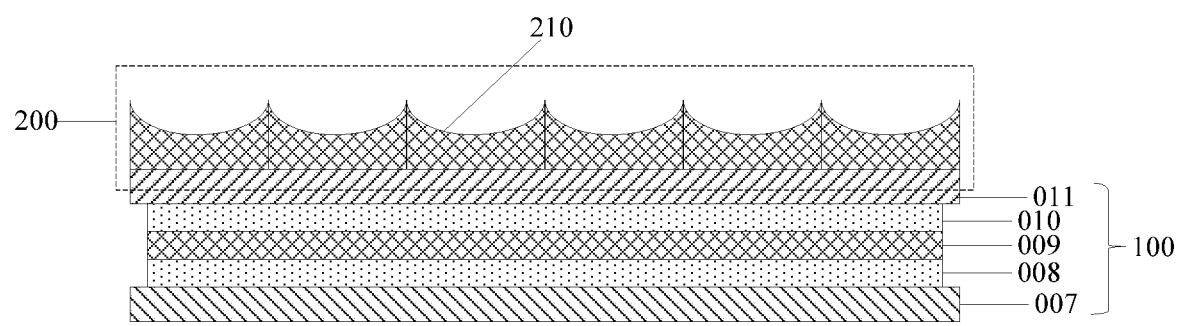
FIG. 6 is a structural schematic diagram of a virtual curved surface display panel according to an embodiment of the invention, in which an electroluminescent display panel is used as a flat display panel.

In an implementation, in the virtual curved surface display panel provided by the embodiment of the present invention, the flat display panel 100 can be any one of a liquid crystal display panel, an electroluminescent display panel, a plasma display panel, or an electronic paper. In FIG. 5, a flat display panel 100 will be described by taking a liquid crystal display panel as an example. The liquid crystal display panel includes: an upper substrate 001 and a lower substrate 002 arranged oppositely, a liquid crystal layer 003 between the upper substrate 001 and the lower substrate 002, an upper polarizer 004 attached over the upper substrate 001, a lower polarizer 005 attached below the lower substrate 002, and a backlight module 006 provided below the lower polarizer 005. A side of the upper polarizer 004 departing away from the liquid crystal layer serves as a display surface (i.e., light exit surface) of the liquid crystal display panel. The concave lens array 200 can be provided over the upper polarizer 004. Light emitted from the backlight module 006 is modulated by the liquid crystal layer 003 and is emitted from the upper polarizer 004. By means of diffraction of the concave lenses 210 in the concave lens array 200 having different focal lengths, the light is imaged. In FIG. 6, a flat display panel 100 will be described by taking an electroluminescent display panel as an example. The electroluminescent display panel includes: an anode 008 provided on a back plate 007, a light emitting layer 009, a cathode electrode 010, and a cover plate 011. For simplicity, the pixels are not shown in FIGS. 4-6. Those skilled in the art will appreciate that, similar to the embodiments shown in FIGS. 1a-1c, in the flat display panels 100 shown in FIGS. 4-6, the plurality of pixels can be arranged to correspond to a plurality of concave lenses 210 one-to-one.

Based on the same inventive concept, an embodiment of the present invention also provides a display device including the above mentioned virtual curved surface display panel. The display device can be any product or component with display function, such as mobile phone, tablet computer, TV, display, notebook computer, digital photo frame, navigator and so on. The implementation of the display device can refer to the embodiments of the above mentioned virtual curved surface display panel, which will not be repeated herein.

In the virtual curved surface display panel and display device provided by the embodiments of the present invention, by using the imaging principle of the concave lens, the concave lens array is provided on the display surface of the flat display panel, and the focal lengths of the concave lenses are designed to be symmetrically distributed with respect to a vertical symmetry axis of the display surface. In the concave lenses on the same side of the symmetry axis, the focal lengths of the respective concave lenses having the same distance from the vertical symmetry axis are the same, and the focal lengths of the respective concave lenses having different distances from the vertical symmetry axis are different from each other. By setting the focal lengths of the concave lenses, the image distances of the pixels in the flat display panel are different so that the images of the plurality of pixels constitute a curved surface. A visual effect of virtual curved surface can thus be realized by applying a flat display panel, thereby enhancing the visual impact effect.

Apparently, the person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

What is claimed is:

1. A virtual curved surface display panel, comprising: a flat display panel having a plurality of pixels arranged in an array, and a concave lens array arranged on a display surface of the flat display panel for making images of the plurality of pixels form a curved surface;
   wherein the concave lens array comprises a plurality of concave lenses arranged in an array; focal lengths of the plurality of concave lenses are symmetrically distributed with respect to a vertical symmetry axis of a display surface of the flat display panel; in the concave lenses on the same side of the symmetry axis, the focal lengths of the respective concave lenses having the same distance from the vertical symmetry axis are the same, and the focal lengths of the respective concave lenses having different distances from the vertical symmetry axis are different from each other.

2. The virtual curved surface display panel according to claim 1, wherein the curved surface is a curved surface protruding toward the flat display panel.

3. The virtual curved surface display panel according to claim 2, wherein a focal length of each concave lens gradually decreases as a distance between the concave lens and the vertical symmetry axis increases.

4. The virtual curved surface display panel according to claim 3, wherein at least one pixel in the flat display panel corresponds to a concave lens in the concave lens array.

5. The virtual curved surface display panel according to claim 3, wherein a sub-pixel in the flat display panel corresponds to at least one concave lens in the concave lens array.

6. The virtual curved surface display panel according to claim 5, wherein a sub-pixel in the flat display panel corresponds to a plurality of concave lenses with the same focal length in the concave lens array.

7. The virtual curved surface display panel according to claim 1, wherein the plurality of concave lenses are biconcave lenses or liquid crystal lenses.

8. The virtual curved surface display panel according to claim 1, wherein the plurality of concave lenses are plano concave lenses.

9. The virtual curved surface display panel according to claim 8, wherein a concave surface of the plano concave lens is arranged on a side of the plano concave lens departing away from a display surface of the flat display panel.

10. The virtual curved surface display panel according to claim 8, wherein the plurality of concave lenses are cylindrical concave lenses.

11. The virtual curved surface display panel according to claim 8, wherein the plurality of concave lenses are spherical concave lenses.

12. The virtual curved surface display panel according to claim 11, wherein the spherical concave lenses have the same aperture.

13. The virtual curved surface display panel according to claim 1, wherein the flat display panel is any one of a liquid crystal display panel, an electroluminescent display panel, a plasma display panel, or an electronic paper.

14. The virtual curved surface display panel according to claim 8, wherein a concave surface of the plano concave lens is arranged on a side of the plano concave lens facing a display surface of the flat display panel.

15. A display device comprising a virtual curved surface display panel; the virtual curved surface display panel comprises: a flat display panel having a plurality of pixels arranged in an array, and a concave lens array arranged on a display surface of the flat display panel for making images of the plurality of pixels form a curved surface;
   wherein the concave lens array comprises a plurality of concave lenses arranged in an array; focal lengths of the plurality of concave lenses are symmetrically distributed with respect to a vertical symmetry axis of a display surface of the flat display panel; in the concave lenses on the same side of the symmetry axis, the focal lengths of the respective concave lenses having the same distance from the vertical symmetry axis are the same, and the focal lengths of the respective concave lenses having different distances from the vertical symmetry axis are different from each other.

16. The display device according to claim 15, wherein the curved surface is a curved surface protruding toward the flat display panel.

17. The display device according to claim 16, wherein a focal length of each concave lens gradually decreases as a distance between the concave lens and the vertical symmetry axis increases.

18. The display device according to claim 17, wherein at least one pixel in the flat display panel corresponds to a concave lens in the concave lens array.

19. The display device according to claim 17, wherein a sub-pixel in the flat display panel corresponds to at least one concave lens in the concave lens array.

20. The display device according to claim 19, wherein a sub-pixel in the flat display panel corresponds to a plurality of concave lenses with the same focal length in the concave lens array.

* * * * *